(12) United States Patent
Land et al.

(10) Patent No.: US 10,401,222 B1
(45) Date of Patent: Sep. 3, 2019

(54) SYSTEM AND METHOD FOR IMAGING THROUGH FLAMES AND SMOKE

(71) Applicant: The United States of America, as represented by the Secretary of the Navy, Arlington, VA (US)

(72) Inventors: Phillip P. Land, Ridgecrest, CA (US); Samuel C. Thompson, Ridgecrest, CA (US); Kaleep R. Williams, Ridgecrest, CA (US); Robert P. Hartwell, Ridgecrest, CA (US)

(73) Assignee: The United States of America, as Represente by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/113,834

(22) Filed: Aug. 27, 2018

(51) Int. Cl.
    *G01J 3/18* (2006.01)
(52) U.S. Cl.
    CPC ................... *G01J 3/1838* (2013.01)

(58) Field of Classification Search
    CPC ........................................................ G01J 1/00
    See application file for complete search history.

(56) References Cited

U.S. PATENT DOCUMENTS

| | | | |
|---|---|---|---|
| 7,289,736 B1 * | 10/2007 | Graves | G02B 26/06 398/119 |
| 2012/0242831 A1 * | 9/2012 | Restaino | G01J 9/00 348/135 |

* cited by examiner

*Primary Examiner* — Hugh Maupin
(74) *Attorney, Agent, or Firm* — James M. Saunders

(57) ABSTRACT

Embodiments are directed to systems and methods for imaging an object obscured by a distorted medium. The embodiments include an object emitting electromagnetic energy due to rapid heating. The electromagnetic energy for the object passes through the distorted medium. Embodiments combine an adaptive optics system, an adaptive holographic plates/filters system, an optical based multi-wavelength sensor system, and a phase diversity processor system to provide a corrected image of the object obscured by the distorted medium.

9 Claims, 4 Drawing Sheets

SYSTEM AND METHOD FOR IMAGING THROUGH FLAMES AND SMOKE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

Embodiments generally relate to sensing, detecting, and imaging an object undergoing fire produced rapid heating of an object.

Figure 1:
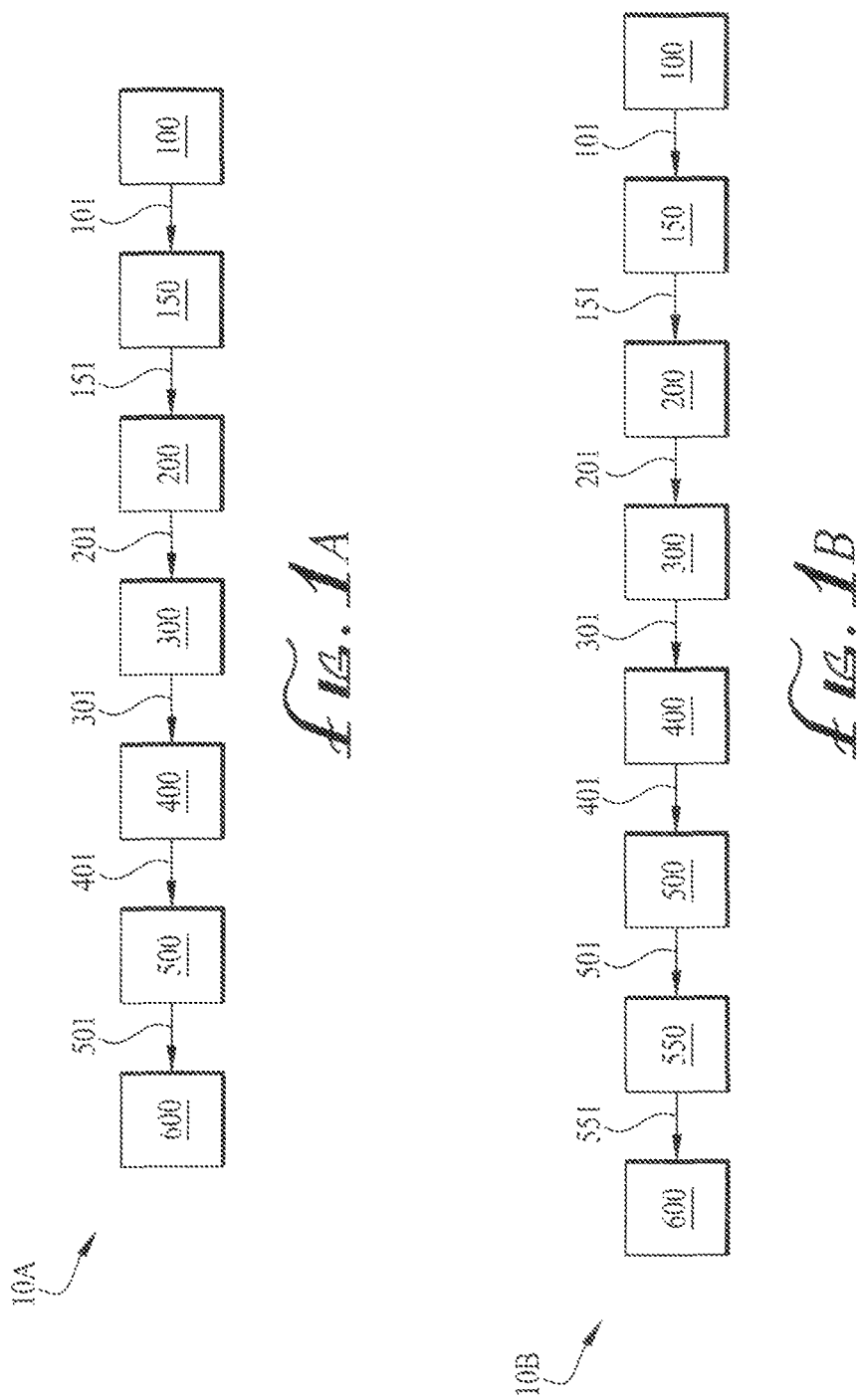
FIG. 1A illustrates an exemplary block diagram for a system for imaging through flames and smoke, according to the embodiments.
FIG. 1B illustrates another exemplary block diagram for a system for imaging through flames and smoke coupled with image fusion, according to the embodiments.

It is to be understood that the foregoing general description and the following detailed description are exemplary and explanatory only and are not to be viewed as being restrictive of the embodiments, as claimed. Further advantages of the embodiments will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments may be understood more readily by reference in the following detailed description taking in connection with the accompanying figures. It is understood that embodiments are not limited to the specific devices, methods, conditions or parameters described and/or shown herein, and that the terminology used herein is for the purpose of describing particular embodiments by way of example only and is not intended to be limiting of the claimed embodiments. Also, as used in the specification, the singular forms "a," "an," and "the" include the plural.

Embodiments are directed to imaging an object undergoing a fast-cook off (FCO) insensitive munitions (IM) or other fire produced rapid heating of an object undergoing an engineering test for research and development. The embodiments can also apply to slow cook-off (SCO) tests due to fire and similar rapid heating reactions. Systems and methods are disclosed for imaging an object engulfed in flames and smoke. The embodiments mitigate distortions of the object's emitted electromagnetic energy through a distorted medium by integrating an adaptive optics system, an adaptive holographic plates/filters system, an optical-based multi-wavelength sensor system, and a phase diversity processor system having a visual display screen for displaying corrected images. Image fusion can optionally be incorporated to combine a plurality of reconstructed images.

Although the embodiments are described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

At the outset, it is helpful to describe various conventions, parameters, and terminology associated with the embodiments.

Rapid Heating: The term "rapid heating" is used herein to describe the drastic increase in temperatures experienced in fires and other similar reactions.

Adaptive: The term "adaptive" is used for two systems—the adaptive optics system 200 and the adaptive holographic plates/filters system 300. As used herein, "adaptive" is a technical term in conjunction with other optics terms to describe improving the performance of various optical systems by reducing distortions, such as wave front distortions.

Science Camera: A "science camera" 203 is a camera used for multispectral imaging applications because it detects an object's emitted wavelengths and has a fast frame rate imager.

Distorted Medium: The term "distorted medium" is used to describe the distortions or alterations experienced in this instance, by electromagnetic energy as it passes through a "distorted medium" 150, discussed in great detail herein as flames or flame turbulence 150A and smoke, smoke particulates, or smoke turbulence 150B. The principles discussed in detail are also applicable to other distorted mediums, including atmospheric disturbances.

Electrically-Coupled: The term "electrically-coupled" is understood to mean optically-connected for light, energy, power, or signal communication. Other variations of the term include phrases such as "in electrical communication with," "electrically-connected," "signal transmission and receiving," and similar variations.

Signal: The word "signal" can be used herein with respect to "light," "emitted light," "electromagnetic energy," "electromagnetic signals," and similar variations for the waves emitted by the object 100 engulfed by the flames 150A and smoke 150B. Additionally, any reference to "signals" herein is entirely directed to non-transitory signals. Transitory signals are specifically excluded.

Exemplary Systems with Functional Components—FIGS. 1A, 1B, 2, 3, & 4

In the accompanying drawings, like reference numbers indicate like elements.

Figure 4:
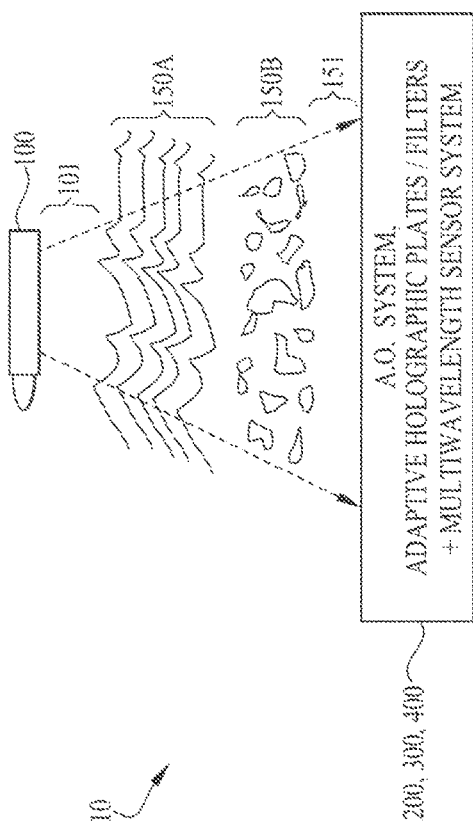
FIG. 4 illustrates an exemplary system for imaging an object through flames and smoke and producing a corrected image using a phase diversity processor system, according to some embodiments.

Reference character 10 in FIG. 4 depicts an exemplary system (operating environment) for imaging through flames and smoke to produce a corrected image. The system 10 is sometimes referred to as an optical imaging train. Two variations of the system 10 are shown in FIGS. 1A & 1B, depicted by reference characters 10A & 10B, respectively. FIG. 1A depicts the system 10A without image fusion processing. FIG. 1B depicts the system 10B with optional image fusion processing 550. Unless stated otherwise, use of the word "system" 10 includes both system variations 10A & 10B. The system 10 can be active or passive and is configured for recognizing and imaging an object 100, which can also be referred to as a target and target object. FIGS. 1A & 1B illustrate passive systems 10A & 10B, respectively.

The object 100 is obscured by a distorted medium 150. The distorted medium 150 can be any number of disturbances including, but not limited to, fog, haze, flames, smoke, and atmospheric disturbances. In particular, the system 10 is directed to sensing, detecting, and imaging the object 100 engulfed in flames and smoke (150A & 150B in FIG. 4). The object 100 is rapidly heated, such as during a fast cook-off (FCO) test and emits electromagnetic energy 101, sometimes referred to as an electromagnetic signal. The embodiments recognize (sense) the electromagnetic energy/electromagnetic signal 101 from the object 100 after passing through the distorted medium 150.

The embodiments include an adaptive optics system 200, adaptive holographic plates/filters 300, an optical-based multi-wavelength sensor system 400, a phase diversity processor system 500, and a visual display screen 600. Each component is discussed in detail below. Optionally, the image fusion processor 550, which can also be referred to as "image fusion" or simply "fusion," combines a plurality of reconstructed images associated with separate sensors/detectors operating in different wavelengths.

Additionally, for ease of understanding, different reference characters are used to depict the electromagnetic energy/signal 101 depending on what component/system it has passed through. Reference character 151 depicts the outgoing electromagnetic energy/signal after passing through the distorted medium 150 and into the adaptive optics system 200. Reference character 201 depicts the outgoing electromagnetic energy/signal after passing through the adaptive optics system 200 and into the adaptive holographic plate(s) 300. Reference character 301 depicts the outgoing electromagnetic energy/signal after passing through the adaptive holographic plate(s) 300 and into the optical-based multi-wavelength sensor system 400. Reference character 401 depicts the outgoing electromagnetic energy/signal after passing through the optical-based multi-wavelength sensor system 400 and into the phase diversity processor system 500. Reference character 501 depicts a processed image after processing by the phase diversity processor system 500, which is input to the visual display screen 600 for user viewing. Reference character 551 depicts the optional output from the image fusion processor 550, such as when there is greater than one corrected image 516, i.e. a plurality of corrected images.

The optical-based multi-wavelength sensor system 400 is a combination of several sensors to image through the distorted region 150, and varies depending on the distorted region. In the exemplary figures, the optical-based multi-wavelength sensor system 400 incorporates particular bandwidth detectors. The optical-based wavelength sensor system 400 is a science camera (shown as reference character 203 in FIG. 2) and, more particularly, an ultraviolet (UV) detector 203A and short-wave infrared (SWIR) detector 203B illustrated in FIG. 3. The UV detector 203A images through the flames 150A and the SWIR detector 203B images through the smoke 150B. While the figures depict SWIR and UV bands, the embodiments can be used for additional multi-spectral bands such as visible, near infrared (NIR), mid-wave infrared (MWIR), and long-wave infrared (LWIR) bands with modification of the optical-based multi-wavelength sensor system 400 by including additional detectors for the particular bandwidths.

Figure 2:
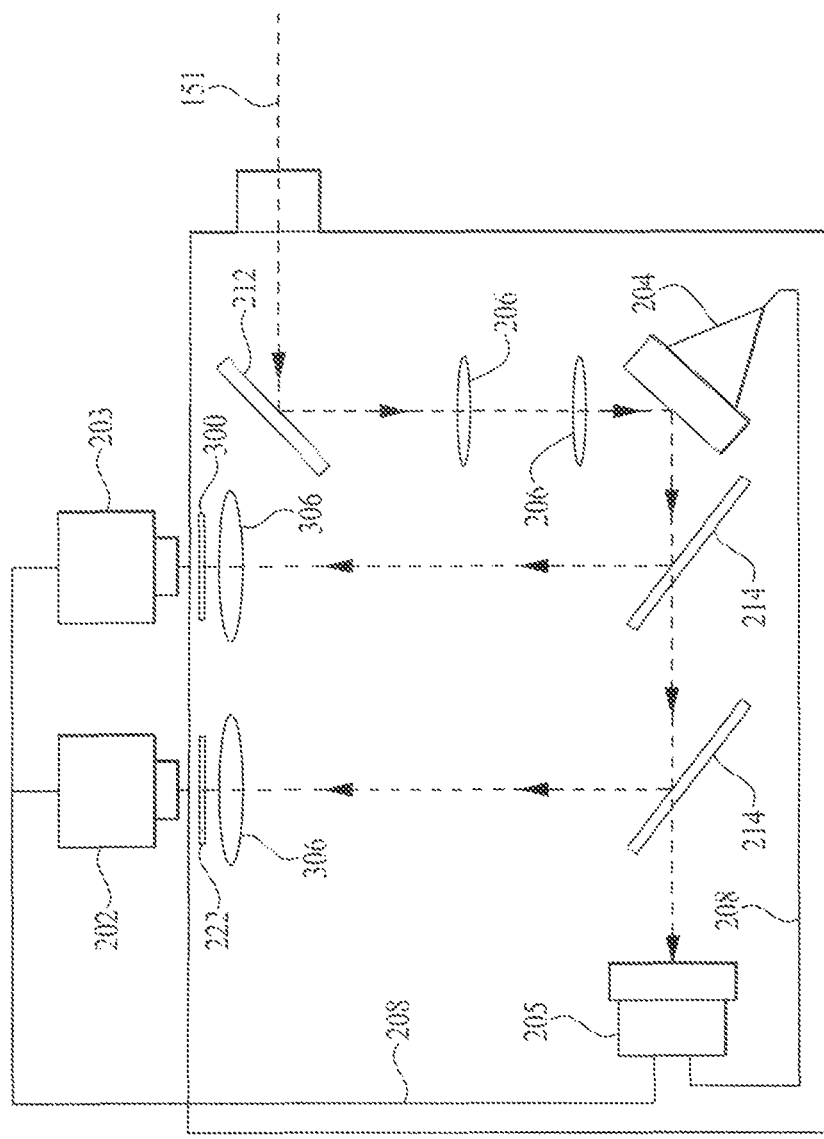
FIG. 2 illustrates functional components of an Adaptive Optics (AO) system, according to the embodiments.

Referring to FIGS. 1A, 1B, & 2, the adaptive optics system 200 detects the electromagnetic energy/signal from the object 100 after it passes through the distorted medium 150. The adaptive optics system 200 mitigates the severe turbulence, sometimes referred to as distortion, resulting from the rapid heating of the object's environment. The adaptive optics system 200 compensates for the resulting severe turbulence.

The AO system 200 mathematically takes the complex conjugate of the random phase caused by distorted medium (flames 150A and smoke 150B) turbulence. The AO system 200 includes a fast steering mirror 204, a deformable mirror 205, and a wave front sensor (WFS) 202 for mitigating the distortions produced by rapid atmospheric changes, such as turbulence and rapid changes due to fire. The AO system 200 includes a combination of beam splitters (abbreviated as BS and depicted as reference character 214) and mirrors (abbreviated as M and depicted with reference character 212) for directing and receiving the incoming electromagnetic energy/signal 151, which can at times, be referred to as incoming ambient light. Arrows show the direction of the incoming ambient light 151. Lenses 206 are used for taking in and focusing the electromagnetic energy/signal 151 after passing through the distorted region 150. The science camera 203 detects the object's emitted wavelengths in the selected bandwidths and obtains images of the same.

The wavefront sensor (WFS) 202 has a wavefront sensor filter 222, sometimes abbreviated as WFS sensor. The WFS sensor 222 and WFS 202 combine to stabilize the incoming electromagnetic energy/signal 151. The WFS 202 is electrically-connected by a wire 208 with the fast steering mirror (FSM) 204 and the deformable mirror (DM) 205. A person having ordinary skill in the art will recognize that lower and upper modes, often called Zernike polynomials, are used in the optics field. The FSM 204 mitigates the lower-order modes. The deformable mirror 205 uses phase-conjugation to undo the distortions and mitigate the higher-order modes. The WFS 202 can provide feedback to both the FSM 204 and the DM 205.

Figure 3:
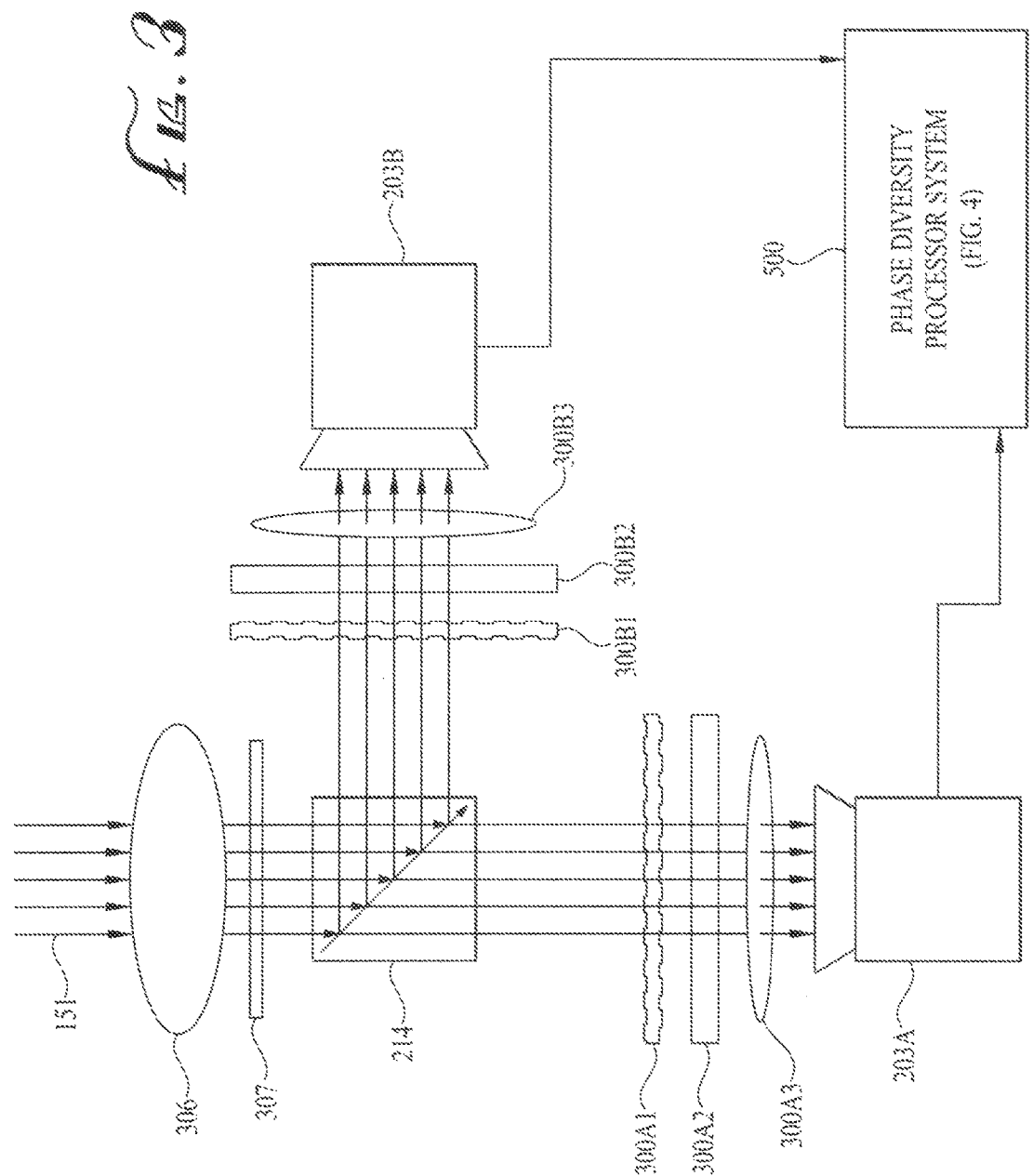
FIG. 3 illustrates the AO system coupled to an adaptive holographic plates/filters system, and an optical-based multi-wavelength sensor system, according to some embodiments.

Referring to FIGS. 1A, 1B, & 3, the adaptive holographic plates/filters 300 filter out background clutter such as clutter or noise to increase the object's wavelengths which improves image quality. The adaptive holographic plates/filters 300 are electrically-coupled to the AO system 200. The adaptive holographic plates/filters 300 can be referred to as "holographic plates/filters" or simply "plates/filters" herein. The holographic plates/filters 300 receive the outgoing electromagnetic energy/signal 201 after passing through the AO system 200. The holographic plates/filters 300 are configured to increase the emitted wavelengths from the object 100 in selected bandwidths (UV band and SWIR band) by filtering out the bandwidths outside of the selected bandwidths. Selecting specific wavelengths such as UV (300 nm to 450 nm) wavelengths can be used for imaging the object's UV spectrum as it undergoes rapid heating. Fire 150A produces smoke 150B from the source which adds an additional barrier for imaging an object 100 engulfed in flames. The SWIR band (700 nm to 2500 nm) views the object 100 through smoke, fog, and haze.

Referring to FIGS. 2, 3, & 4, the adaptive optics system 200, the adaptive holographic plates/filters 300, and the optical based multi-wavelength sensor system 400 combine to obtain at least one image 490, which is sometimes referred to as an uncorrected or unfocused image, of the object's emitted energy wavelengths in the selected/desired bandwidths. The uncorrected images 490 are input to the phase diversity processor system 500 for imaging the object 100 through flames 150A and smoke 150B.

As shown in FIG. 3, incoming electromagnetic energy/signal/light 151 is taken in through telescope, telescopic lens, or telescopic lens system 306, an MWIR filter 307 filters out mid-wave infrared wavelengths (3 µm to 5 µm). The light 151 is split by the beam splitter (BS) 214. Imaging through the flames 150A is depicted by following the path down the page on the left hand side of FIG. 3. Light passes through the holographic plate 300A1 and filter 300A2. The holographic plate 300A1 and filter 300A2 combine to filter out visible and infrared wavelengths (0.4 µm to 5 µm) and relay its output to a focusing lens 300A3 to focus ultraviolet (UV) waves to the optical based multi-wavelength sensor system 400, which is the science camera configured as a UV detector 203A, sometimes referred to as a UV sensor. The UV detector 203A senses/detects the UV waves (0.2 µm to 0.35 µm) and obtains the uncorrected image 490 through the flames 150A for input into the phase diversity processor 500 for correction.

The path from the middle to right hand side of FIG. 3 illustrates imaging through smoke 150B. Light passes through the holographic plate 300B1 and filter 300B2. The holographic plate 300B1 and filter 300A2 combine to filter out visible wavelengths (0.4 µm to 0.75 µm) and relay its output to a focusing lens 300B3 to focus short-wave infrared (SWIR) waves to the optical based multi-wavelength sensor system 400, which is the science camera configured as an SWIR detector 203B, sometimes referred to as a SWIR sensor. The SWIR detector 203B senses/detects SWIR waves (0.75 µm to 2.5 µm) and obtains the uncorrected image 490 through the smoke 150B for input into the phase diversity processor 500 for correction.

Referring to FIG. 4, the phase diversity processor system 500 is configured to input corrected (final) images to the visual display screen 600. The phase diversity processor system 500 is coupled to the optical based multi-wavelength sensor system 400 and is configured to receive at least one uncorrected image from the optical based multi-wavelength sensor system 400. As shown and discussed in FIG. 3, the phase diversity processor 500 receives two uncorrected images 490, one for the UV band (from the UV detector 203A) and one for the SWIR band (from the SWIR detector 203B). The phase diversity processor 500 uses blind deconvolution techniques to process the uncorrected images 490. The blind deconvolution techniques do not have a priori knowledge of what is being imaged. The processes reconstruct the uncorrected image 490 of the object 100 engulfed in flames 150A and smoke particulates 150B. In essence, the phase diversity processor system 500 morphs the uncorrected image 490 into a picture and displays the picture on the visual display screen 600 for user verification, which can be very important before dedicating additional resources to the object 100.

The uncorrected images 490 are of the object 100 in two known positions. The uncorrected images 490 are distorted by uncorrected aberrations in the medium 150 (the flames turbulence 150A and smoke turbulence 15013) between the object 100 and the AO system 200. The uncorrected images 490 are used in estimating the distortions affecting the uncorrected image and in generating a corrected (final) image 516.

The phase diversity processor 500 is programmed to iteratively solve inverse problems of point-spread functions associated with observed aberrations to produce the corrected image 516 and an estimate of wavefront distortions. The phase diversity processor 500 performs phase diversity image reconstruction. In arriving at a final solution, the wavefront estimate that the phase processor 500 settles upon as the best match for the images provided, the phase diversity processor generates a reconstruction of the phase aberrations that resulted in aberrations in the images. The phase diversity processor 500 reconstructs wavefront errors 502, called wavefront error estimates. The phase diversity processor 500 is programmed to iteratively solve inverse problems of point-spread functions (by iterating through a reconstruction loop 504), associated with observed aberrations to produce the corrected image 516 and wavefront errors 502, i.e. estimate of wavefront distortions associated with the uncorrected image (490) for the detectors 203A & 203B.

The phase diversity processor 500 iterates through the reconstruction loop 504 and solves an error metric function 506 using the defocused images 490 and the wave front error estimate 502 generated during the previous iteration. The number of iterations is based on user discretion and operating environment. The image reconstructed using the final iteration's wavefront estimate 502 is deemed to be a reconstructed image 508.

The phase diversity processor 500 performs phase diversity image reconstruction using the error metric function 506 to indicate the quality of reconstruction produced by a given wavefront estimate 502. Using one optical pathway for all detectors 203A & 203B, with the same wavefront aberration being seen by multiple cameras operating at different wavelengths, a single wavefront estimate 502, expressed in terms of distance, is used to generate aberrating point spread functions seen in each image. Modifying the Gonsalves notation so that $I_{nm}$ corresponds to the $m^{th}$ image associated with the $n^{th}$ camera or set of cameras, the expanded merit function used to evaluate potential solutions would then be $$E = \sum \begin{Bmatrix} \alpha_1[|I_{11} - I_0 S_{11}|^2 + |I_{12} - I_0 S_{12}|^2] + \\ \alpha_2[|I_{21} - I_0 S_{21}|^2 + |I_{22} - I_0 S_{22}|^2] + \ldots + \\ \alpha_k[|I_{k1} - I_0 S_{k1}|^2 + |I_{k2} - I_0 S_{k2}|^2] \end{Bmatrix}$$

where the coefficients of $\alpha_k$ being weighting functions for the different sensor wavelengths. This method would use a monochrome estimate for the true image of $$I_0 = \frac{\alpha_1 \lfloor I_{11} S_{11}^* + I_{12} S_{12}^* \rfloor + \alpha_2 \lfloor I_{21} S_{21}^* + I_{22} S_{22}^* \rfloor + \ldots + \alpha_k \lfloor I_{k1} S_{k1}^* + I_{k2} S_{k2}^* \rfloor}{\alpha_1[|S_{11}|^2 + |S_{12}|^2] + \alpha_2[|S_{21}|^2 + |S_{22}|^2] + \ldots + \alpha_k[|S_{k1}|^2 + |S_{k2}|^2]}.$$

Alternatively, if the object being viewed is expected to have a significantly different appearance under different wavelengths, then separate image estimates of the form $$I_{0k} = \frac{\lfloor I_{k1} S_{k1}^* + I_{k2} S_{k2}^* \rfloor}{[|S_{k1}|^2 + |S_{k2}|^2]}$$

can be used with each set of images associated with a given wavelength.

A search algorithm 510, such as, for example, a gradient-based minimization and/or a neighborhood search, is used within the reconstruction loop 504. A neighborhood search, also called a global search, tries a number of widely-scattered possibilities to find a good-scoring/low-lying region of the search space of possible values. The gradient-based minimization is a localized search that makes small adjustments to the current guess to determine which direction in the search space would be considered "downhill," leading to lower or better scores for the error metric. However, in some embodiments, a two-stage method of finding a solution is implemented. Gradient-based search methods are susceptible to remaining in local minima, while other methods are better at finding a global "neighborhood" that can then be refined with a gradient method.

Once the reconstructed image 508 is generated by the phase-diversity processor 500, some embodiments use edge windowing and/or selective frequency filtering 512 to reduce noise in the reconstructed image, while adjustments to background brightness and image contrast 514 are used to enhance visibility of details in the reconstructed image. In these embodiments, the resulting image is the corrected image 516. Other embodiments use neither edge windowing nor selective frequency filtering 512. In these embodiments, the reconstructed image 508 is the corrected image 516. Real-time sharpening and compensation is possible with parallel processing utilizing computer hardware such as field programmable gate arrays (FPGA) and graphical processing units (GPU).

The image fusion processor 550, which is an electronic processor, can be used to perform image fusion to combine a plurality of corrected images 516 associated with separate sensors/detectors 203A & 203B operating in different wavelengths (such as UV and SWIR) to obtain at least one composite image with extended information content. Image fusion can also be used to combine multiple images from a given sensor to form a composite image in which information of interest is enhanced. Any form of image fusion technique may be used. The embodiments are independent of any specific technique of image fusion. In one embodiment, the image fusion is an image combination technique, for example, in a pyramid transform. An image pyramid is first constructed for each sensor/detector 203B & 203B image, then a pyramid is formed for the composite image by selecting coefficients from the source image pyramids and finally, the composite image is recovered through an inverse pyramid transform.

The embodiments can also be used for visually verifying the Strehl ratio, which can be displayed on the visual display screen. A person having ordinary skill in the art will recognize that the Strehl ratio is a metric for the effectiveness of an AO system. The visual display screen 600 is a tangible medium for displaying output, such as the final (corrected) images 516 and the Strehl ratio. Other tangible outputs are also possible. As such, in the embodiments, the tangible outputs may be shown and/or represented as a visual display screen depiction, hard copy printouts, as well as other media using the information such as, for example, a computer having computer-readable instructions that is configured to use output from the embodiments.

While the embodiments have been described, disclosed, illustrated and shown in various terms of certain embodiments or modifications which it has presumed in practice, the scope of the embodiments is not intended to be, nor should it be deemed to be, limited thereby and such other modifications or embodiments as may be suggested by the teachings herein are particularly reserved especially as they fall within the breadth and scope of the claims here appended.

What is claimed is:

1. A system for imaging an object obscured by a distorted medium, comprising:

an object emitting electromagnetic energy, wherein said emitted electromagnetic energy passes through a distorted medium;

an adaptive optics system configured to detect said electromagnetic energy from said object after said electromagnetic energy passes through said distorted medium, wherein said adaptive optics system is configured to mitigate turbulence resulting from rapid heating of said object's environment;

an adaptive holographic plates/filters system coupled to said adaptive optics system, wherein said adaptive holographic filters/plates system is configured to increase said object's emitted wavelengths in selected bandwidths and filter out wavelengths outside of said selected bandwidths;

an optical based multi-wavelength sensor system coupled to said adaptive holographic filters/plates system, wherein said optical based multi-wavelength sensor system obtains at least one image of said object's emitted wavelengths in said selected bandwidths;

wherein said selected bandwidths are ultraviolet (UV) and short-wave infrared (SWIR) bands, wherein said adaptive holographic plates/filters system is configured to increase said object's emitted wavelengths in said UV band and said SWIR band, said adaptive holographic plates/filters system filters out wavelengths outside of said UV band and said SWIR band;

wherein said optical based multi-wavelength sensor system having a UV detector for imaging through flames and an SWIR detector for imaging through smoke, wherein said optical based multi-wavelength sensor system obtains at least one image of said object's emitted wavelength in said UV band and at least one image of said object's emitted wavelength in said SWIR band; and a phase diversity processor system having a visual display screen, said phase diversity processor system coupled to said optical based multi-wavelength sensor system, said phase diversity processor system configured to receive at least one uncorrected image from said optical based multi-wavelength sensor system, and process said at least one uncorrected image into at least one corrected image and display said at least one corrected image on said visual display screen.

2. The system according to claim 1, wherein said rapid heating of said object's environment is by fire.

3. The system according to claim 1, wherein said object is engulfed in flames and smoke.

4. The system according to claim 1, wherein said distorted medium comprising a flames turbulence zone and a smoke particulates zone between said object and said adaptive optics system.

5. The system according to claim 1, wherein said phase diversity processor system is configured to reconstruct said at least one uncorrected image of said object engulfed in flames and smoke, wherein said phase diversity processor system, further comprising:

at least one phase diversity processor programmed to produce at least one corrected image from said at least one uncorrected image; and wherein said at least one phase diversity processor is configured to apply a blind deconvolution method to reconstruct said at least one uncorrected image and filter said at least one uncorrected image into said at least one corrected image.

6. The system according to claim 5, wherein said phase diversity processor system does not have a priori knowledge.

7. The system according to claim 5, wherein said at least one phase diversity processor is programmed to iteratively solve inverse problems of point-spread functions associated with observed aberrations to produce said at least one corrected image and an estimate of wavefront distortions associated with said at least one uncorrected image.

8. The system according to claim 5, wherein the number of said at least one corrected image is at least two.

9. The system according to claim 8, further comprising an electronic processor configured to perform image fusion using at least two of said at least two corrected images.

\* \* \* \* \*